United States Patent [19]
Braunecker et al.

[11] Patent Number: 5,294,971
[45] Date of Patent: Mar. 15, 1994

[54] WAVE FRONT SENSOR

[75] Inventors: Bernhard Braunecker, Rebstein; Bernhard Gaechter, Balgach; André Huiser, deceased, late of Luchingen, all of Switzerland, by Christiane Huiser-Simonin, heiress

[73] Assignee: Leica Heerbrugg AG, Heerbrugg, Switzerland

[21] Appl. No.: 768,845

[22] PCT Filed: Feb. 2, 1991

[86] PCT No.: PCT/EP91/00194

§ 371 Date: Oct. 7, 1901

§ 102(e) Date: Oct. 7, 1991

[87] PCT Pub. No.: WO91/12502

PCT Pub. Date: Aug. 22, 1991

[30] Foreign Application Priority Data

Feb. 7, 1990 [DE] Fed. Rep. of Germany ....... 4003698

[51] Int. Cl.$^5$ ............................................. G01J 1/00
[52] U.S. Cl. ................................. 356/121; 250/201.9
[58] Field of Search ............... 356/121, 122, 353, 354, 356/359, 360; 250/201.9; 359/1, 30

[56] References Cited

U.S. PATENT DOCUMENTS

| H615 | 4/1989 | Feinleib et al. | 250/201.9 |
|---|---|---|---|
| 4,141,652 | 2/1979 | Feinleib | 356/121 |
| 4,438,330 | 3/1984 | Hardy | 250/201.9 |
| 4,441,019 | 4/1984 | Hardy | 250/201.9 |
| 4,490,039 | 12/1984 | Bruckler et al. | 356/121 |
| 4,641,962 | 2/1987 | Sueda et al. | 356/124 |
| 4,824,243 | 4/1989 | Wheeler et al. | 250/201.9 |

FOREIGN PATENT DOCUMENTS

| 3318293 | 5/1982 | Fed. Rep. of Germany . |
|---|---|---|
| 3318293A1 | 12/1983 | Fed. Rep. of Germany . |

OTHER PUBLICATIONS

Optical Engineering, "Coded Aperture Imaging: Many Holes Make Light Work", vol. 19 No. 3, pp. 283-289, May/Jun. 1980, Cannon et al.
"Hartmann and Other Screen Tests" pp. 323-334, I. Ghozeil.
Analytical Chemistry, "A Thousand Points of Light: The Hadamard Transform", vol. 61, No. 11, Jun. 1989 pp. 724A-734A, Treado et al.
M. Harwit et al., "Hadamard Transform Optics", Academic Press, 1979.

*Primary Examiner*—Richard A. Rosenberger
*Assistant Examiner*—Hoa Q. Pham
*Attorney, Agent, or Firm*—Foley & Lardner

[57] ABSTRACT

A wave front sensor having a focusing optical system (1), a perforated diaphragm (2) with a plurality of perforations (21) situated simultaneously in the beam path (3), in an encoded arrangement, in particular according to a cyclic Hadamard code, a device (22) for advancing the perforated diaphragm (2), so that a multiplicity of different encoded arrangements of perforations (21) are situated successively in the beam path (3). The entire cross section of the beam path (3) is repeatedly scanned overall with different encoded arrangements of perforations (21), a space-resolving light detector (41) which is disposed close to the focal plane (4) of the optical system (1), in particular a lateral detector with a spatial resolution in the nm range, which determines in each instance the position and intensity of the light spot (33) which results from the superposition of the plurality of beams (32) generated by the perforations (21), and a storage and computing unit (5), which reconverts the position and intensity values determined by the light detector (41), using the code of the arrangement of the perforations (21), into the phase and amplitude of the wave front.

15 Claims, 4 Drawing Sheets

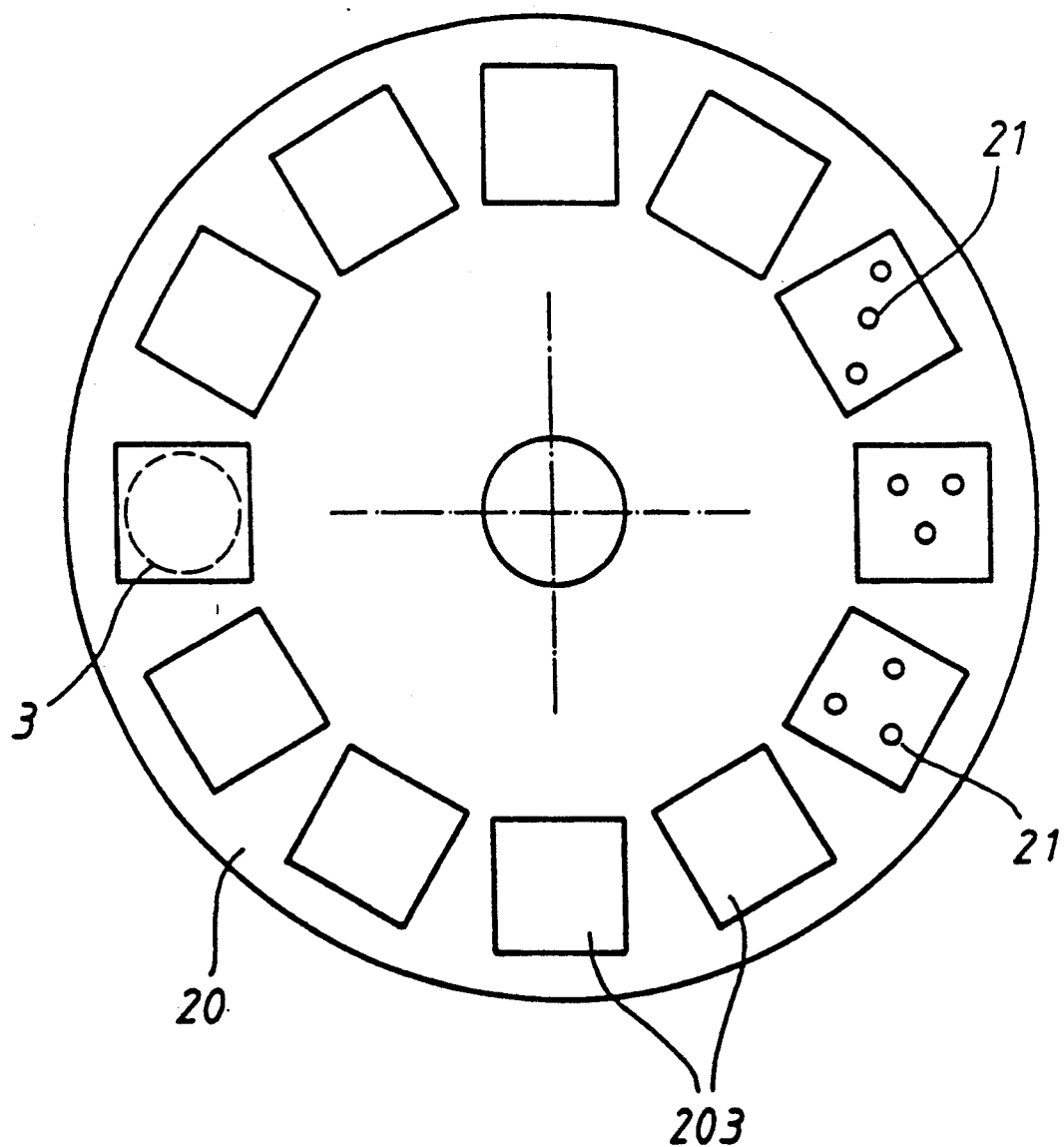

WAVE FRONT SENSOR

The invention relates to a wave front sensor.

Known wave front sensors operate by interferometry or holography. These are sensitive to environmental influences, such as temperature changes.

The testing of objectives by the Hartmann test, known, for example, from German patent document DE 3,318,293 A1, scans the objective aperture with one or more beams which are masked out by a movable perforated diaphragm with one or more perforations and employs a space-sensitive detector. In particular a photographic fim is disposed in front of, or behind, the focal plane. In the case of a plurality of perforations as in German patent document (DE 3,318,293 A1), the detector is disposed and designed so that signals associated with the individual perforations are recorded separately.

In D. Malacara, Optical Shop Testing, Chapter 10 I, "Ghozeil, Hartmann and Other Screen Tests," pp. 323 et seq., Wiley New York 1978, the Hartmann Test is described in terms of variants. The analytical theory is also described.

Optical multiplex processes using code matrices according to Hadamard are described in M. Hewitt and N. J. A. Sloane, Hadamard Transform Optics, Academic Press, New York, 1979, for spectrometers and image analysis systems. Using these processes, it is possible to achieve substantial noise suppression.

The object of the invention is to provide an efficient and robust low-noise wave front sensor by which the amplitude and phase of the wave front can be determined. It is then also possible to determine from this the remote radiation field of the wave.

This is achieved by a wave front sensor having a focusing optical system, a diaphragm with a plurality of perforations, situated simultaneously in the beam path in an encoded arrangement, a device for advancing the perforated diaphragm, so that a multiplicity of different encoded arrangements of perforations are situated in succession in the beam path and the entire cross section of the beam path is repeated scanned overall with different encoded arrangements of perforations, a space-resolving light detector, which is disposed close to the focal plane of the optical system and which determines in each instance the position and intensity of the light spot which results from the superposition of the plurality of beams generated by the perforations, so that a multiplex effect arises, and a storage and computing unit, which reconverts the position and intensity values determined by the light detector using the code of the arrangement of the perforations, into the phase and amplitude of the wave front.

The invention is explained with the aid of the drawings, in which:

FIG. 1 diagrammatically shows the overall construction of a wave front sensor.

FIG. 4 shows a disk with perforated diaphragms which form orthogonally encoded regions.

Figure 1:
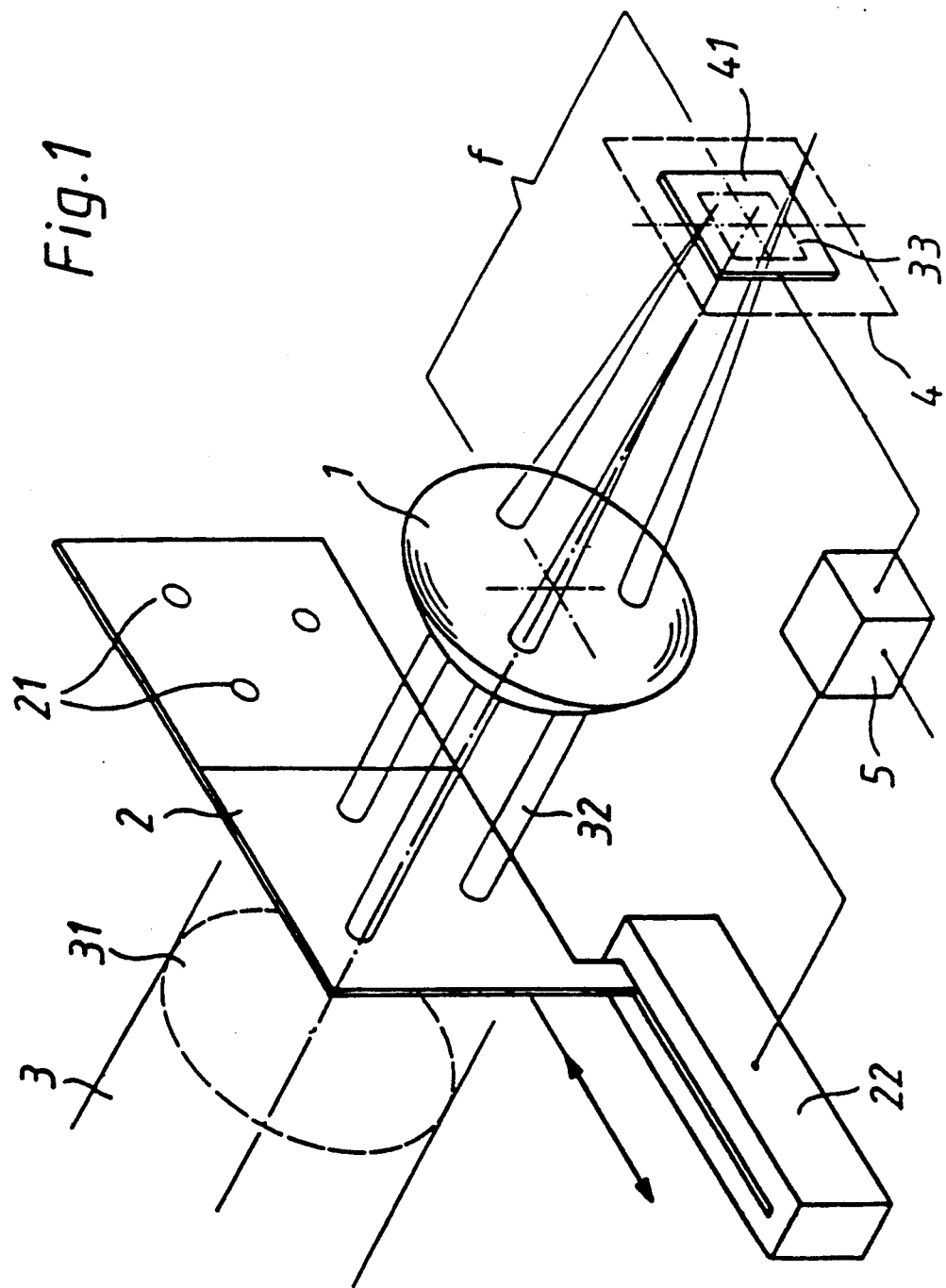

The wave front sensor shown in FIG. 1 includes a highly corrected focusing optical system 1, represented as a simple converging lens, a perforated diaphragm 2 which exhibits in the parallel beam path 3 corresponding to the wave front 31 a plurality of perforations 21 which are disposed in an encoded configuration and, in the focal plane 4 (spacing f from the principal plane of the lens) a high spatial resolution light detector 41.

The beams 32 passing through the perforations 21 have their real focus dependent upon disturbance of the wave front 31 at locations which deviate from the ideal focus. However, they are superposed on the detector 41 to form a light spot 33. The detector 41 is chosen to be of such a size that the entire light spot which is formed when the perforated diaphragm 2 is removed can be detected in its entirety. This gives a multiplex effect and the noise suppression associated therewith. A suitable detector 41 is a lateral detector of the SITEK 2L4 type, with a $4 \times 4$ mm$^2$ detector surface area and a spatial resolution for the point of concentration of the intensity of the light spot 33 in the nanometer range.

The perforated diaphragm 2 is connected to an advancing device 22, which successively brings differently encoded arrangements of perforations 21 into the beam path 3.

This is repeated until overall the entire cross section of the beam path 3 has been scanned with all raster points repeatedly in combination with various other raster points.

The light detector 41 and the advancing device 22 are connected to a storage and computing unit 5, which reconverts the position and intensity values determined by the light detector 41, using the code of the arrangement of the perforations 21, into the phase and amplitude of the wave front.

A cyclic Hadamard code is, in particular, suitable as the code.

The reconversion may take place so that, using for example algorithms known from M. Hewitt, N. J. A. Sloane, loc. cit., a "demultiplex" step is performed. This determines for each raster element of the perforated diaphragm the light spot generated individually in each instance, on the basis of position and intensity. On this basis, the theory known from D. Malacara, I. Ghozeil, loc. cit. can then be employed to determine the distribution of phases and amplitude over the wave front.

Figure 2:
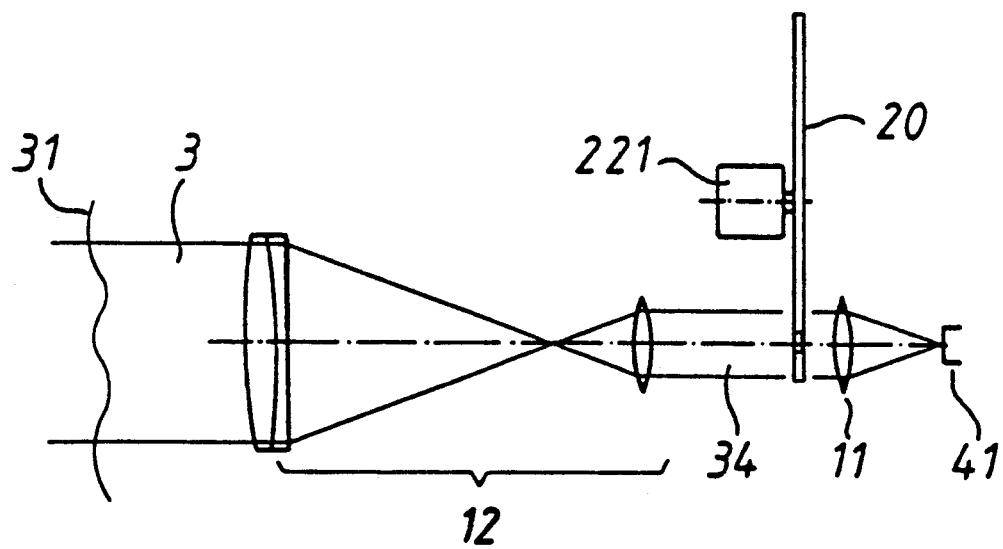
FIG. 2 shows a variant with a telecentric optical system, and a rotating disk as the carrier of the perforated diaphragm.

A variant is shown in FIG. 2. To measure wave fronts 31 of large diameter, e.g. 100 mm, the focusing optical system 1 includes a telecentric optical system 12, which converts the beam path 3 into a parallel beam of reduced cross section 34, in which the perforated diaphragm 2 is disposed in front of a converging lens 11. The perforated diaphragm 2 is disposed on a disk 20 which is rotated by a stepping motor 221. The reduced cross section 34 may have, for example, a diameter of 8 mm, which is scanned with an $8 \times 8$ raster with perforations 21 having a diameter of 0.8 mm using a raster dimension of 1 mm.

To determine relative deformations of the wave front 31, the position of the sensor 41 and the stability of the perforated diaphragm do not need to be known in particular detail, as they are averaged out. Accordingly, the rotating disk can be suspended in relation to the optical system with oscillation damping, so that the spatial resolution of the light detector 41 is not impaired by oscillations of the disk drive 22, 221. The apparatus is also to a large extent insensitive to temperature and pressure fluctuations.

Figure 3A:
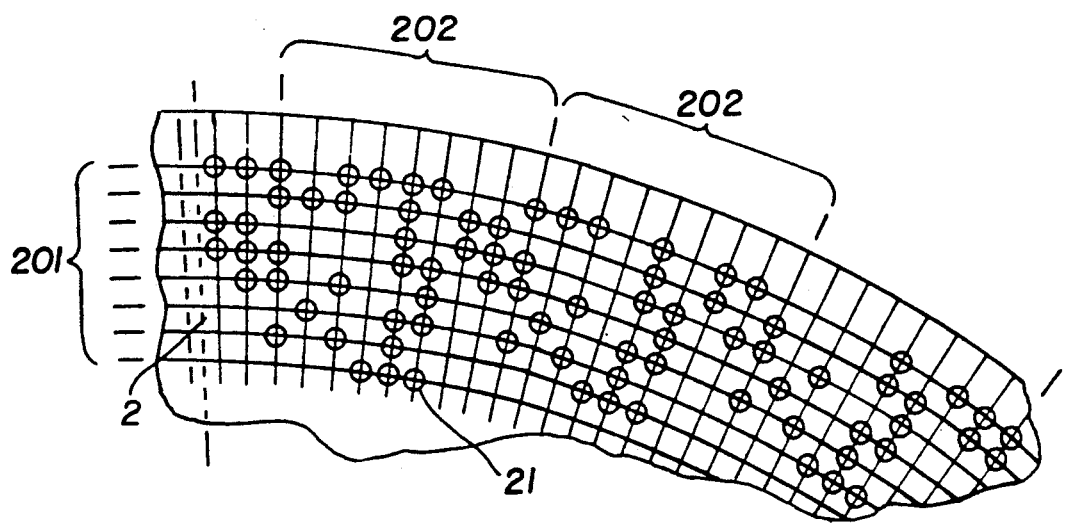
FIGS. 3a and 3b show a disk with a perforated diaphragm according to a cyclic Hadamard code with a radial arrangement of perforations.
Figure 3B:
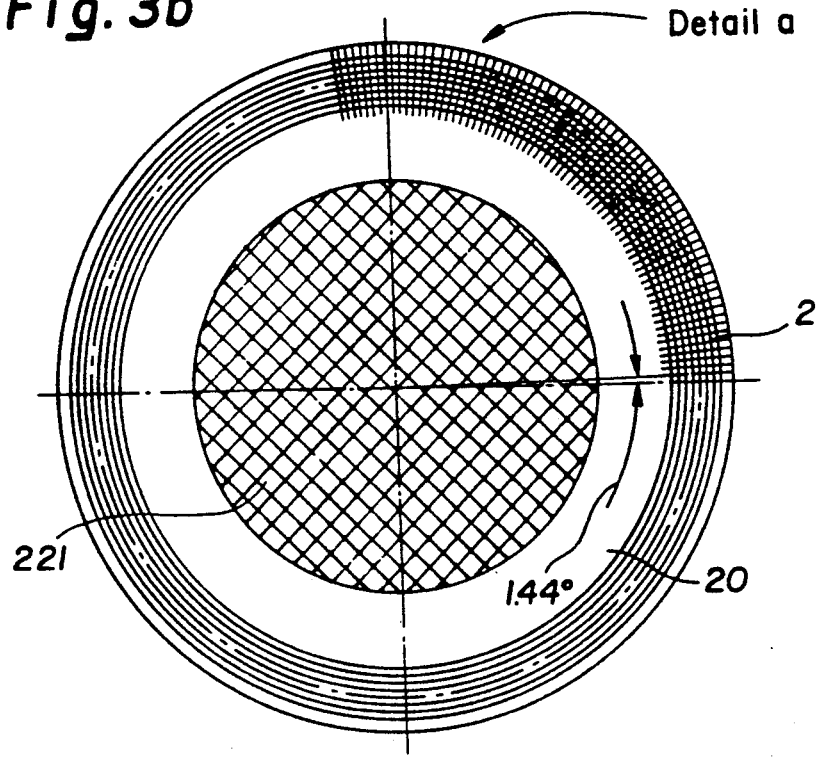

FIG. 3a) shows a detailed section of a disk 20 according to FIG. 3b) with a perforated diaphragm 2 according to a cyclic Hadamard code, with a radial arrangement of the perforations 21 in eight code lines and with an eight step period 202 of the code columns in a radial arrangement. A stepping motor 221 drives the disk 20 and has the same stepping angle of 1.44° as the perforated diaphragm 2.

For measurement purposes, advance of the diaphragm takes place in each instance by such an angular step.

FIG. 4 shows an alternative disk 20, the perforated diaphragms 2 of which form regions 203 which are orthogonally encoded with perforations 21 and which displaced tangentially and are rotated successively into the beam path 3. In this case, it is possible to achieve a symmetrical distribution of the scanning points over the wave front 31.

Using a wave front sensor as described, it is possible to measure with accuracy wave fronts 31 of diameters up to approximately 100 mm, using light power of a few milliwatts to a few percent of the wavelength and a measurement time of a few seconds.

The unavoidable disturbance of the wave by the optical system 1 may be corrected by calibration of this effect. A "process and apparatus for testing optical systems or components" according to the simultaneously filed German application P-4003-699.5 filed Feb. 07, 1990 of the same applicant is suitable for this purpose.

The perforated diaphragm 2 can also be disposed in the convergent beam path, e.g. between lens 11 and detector 41.

It is possible to dispense with mechanically moved parts entirely, if the perforated diaphragm 2 is designed as an electrooptical shutter matrix, e.g. using LCD technology.

Modifications of the invention are possible, inter alia, by the most widely differing combinations of the features of the individual claims.

We claim:

1. A wave front sensor comprising:
   a focusing optical system (1),
   a diaphragm (2) with a plurality of perforations (21), situated simultaneously in a beam path (3), the perforations positioned in an encoded arrangement,
   a device (22) for advancing the perforated diaphragm (2), so that a multiplicity of different encoded arrangements of perforations (21) are situated successively in the beam path (3) and the entire cross section of the beam path (3) is scanned overall repeatedly with different encoded arrangements of perforations (21),
   a space-resolving light detector (41), which is disposed close to the focal plane (4) of the optical system (1) and which determines in each instance a position and intensity of a light spot (33) which results from a superposition of the plurality of beams (32) generated by the perforations (21), and
   a storage and computing unit (5), which reconverts the position and intensity values determined by the light detector (41), using the code of the arrangement of the perforations (21), into a phase and amplitude of a wave front.

2. A wave front sensor according to claim 1, characterized in that the code of the perforated diaphragm (2) is a Hadamard code.

3. A wave front sensor according to claim 2, characterized in that the code of the perforated diaphragm (2) is a cyclic Hadamard code.

4. A wave front sensor according to claim 3, characterized in that the perforations (21) are disposed so as to be radially encoded and the rotary drive takes place by a stepping motor (21).

5. A wave front sensor according to claim 2, characterized in that the perforations (21) are disposed in orthogonally encoded regions (203), which have the cross-section of the beam path (3) at the perforated diaphragm (2), a plurality of such regions (203) is disposed tangentially on the disk (20), and the regions (203) are pivoted successively into the beam path (3).

6. A wave front sensor according to claim 1, characterized in that the perforated diaphragm (2) is attached to a disk (20) and is advanced by rotation of the disk (20).

7. A wave front sensor according to claim 6, characterized in that the perforations (21) are disposed to be radially encoded and the rotary drive takes place by a stepping motor (21).

8. A wave front sensor according to claim 6, characterized in that the perforations (21) are disposed in orthogonally encoded regions (203), which have the surface area of the beam path (3) at the perforated diaphragm (2), a plurality of such regions (203) being disposed tangentially on the disk (20), and the regions (203) are pivoted successively into the beam path (3).

9. A wave front sensor according to claim 1, characterized in that the light detector (11) is disposed as precisely as possible in the focal plane (4).

10. A wave front sensor according to claim 1, characterized in that the light detector (41) is a lateral detector with a spatial resolution in the nanometer range.

11. A wave front sensor according to claim 1, characterized in that the perforated diaphragm (2) is disposed in a parallel beam path.

12. A wave front sensor according to claim 1, characterized in that the perforated diaphragm (2) is disposed in a convergent beam path.

13. A wave front sensor according to claim 1, characterized in that the perforated diaphragm (2) is fitted in front of the focusing optical system (1).

14. A wave front sensor according to claim 1, characterized in that the focusing optical system (1) includes a telecentric optical system (12) which reduces the cross section of the wave front, and the perforated diaphragm (2) is disposed within the focusing optical system (1) in a parallel beam path of reduced cross section (34).

15. A wave front sensor according to claim 1, characterized in that the perforated diaphragm (2) is designed as an electrooptical shutter matrix and is advanced by electronic drive control.

* * * * *